(12) United States Patent
Wu et al.

(10) Patent No.: US 10,615,890 B1
(45) Date of Patent: Apr. 7, 2020

(54) RADIO FREQUENCY PHASE CORRECTION SYSTEMS AND METHODS

(71) Applicant: Ball Aerospace & Technologies Corp., Boulder, CO (US)

(72) Inventors: Gordon C. Wu, Lafayette, CO (US); Cynthia Wallace, Louisville, CO (US); David W. Draper, Longmont, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 16/209,749

(22) Filed: Dec. 4, 2018

Related U.S. Application Data

(60) Provisional application No. 62/665,209, filed on May 1, 2018.

(51) Int. Cl.
| | | |
|---|---|---|
| *H04B 17/12* | (2015.01) | |
| *H04B 17/391* | (2015.01) | |
| *H04B 17/24* | (2015.01) | |
| *H04B 17/14* | (2015.01) | |

(52) U.S. Cl.
CPC ............. *H04B 17/12* (2015.01); *H04B 17/14* (2015.01); *H04B 17/24* (2015.01); *H04B 17/391* (2015.01)

(58) Field of Classification Search
CPC ........ H04B 17/12; H04B 17/14; H04B 17/24; H04B 17/391
See application file for complete search history.

(56) References Cited

U.S. PATENT DOCUMENTS

| | | | | |
|---|---|---|---|---|
| 3,633,203 A | * | 1/1972 | Kreinheder | G01S 13/4409 342/149 |
| 5,309,162 A | * | 5/1994 | Uematsu | G01S 3/48 342/359 |
| 5,402,129 A | * | 3/1995 | Gellner | G01S 13/348 342/70 |
| 5,940,034 A | * | 8/1999 | Leung | H04B 1/126 342/359 |
| 6,570,535 B1 | * | 5/2003 | Stevens | H01Q 3/2605 342/354 |
| 8,305,265 B2 | * | 11/2012 | Ezal | G01C 21/005 342/357.36 |
| 8,427,384 B2 | * | 4/2013 | Clymer | H01Q 1/185 343/776 |

(Continued)

OTHER PUBLICATIONS

Chen et al. "Determining RF Angle of Arrival Using COTS Antenna Arrays: A Field Evaluation," IEEE, 2012 IEEE Military Communications Conference Oct. 29-Nov. 1, 2012, 6 pages.

(Continued)

*Primary Examiner* — David Bilodeau
(74) *Attorney, Agent, or Firm* — Sheridan Ross P.C.

(57) ABSTRACT

Phase correction systems and methods capable of operating in a deployed antenna system are provided. The phase correction system includes a signal generator and a signal coupler. The signal coupler injects a signal at an end of a signal line adjacent an antenna element. Changes in an effective length of the signal line can be detected at a controller that monitors characteristics of the injected signal after it has passed through the signal line. The system can adapt to detected changes in the electrical length by controlling an adjustable phase shifter provided in line with the signal line or by applying suitable post-processing.

19 Claims, 4 Drawing Sheets

(56) References Cited

U.S. PATENT DOCUMENTS

| | | |
|---|---|---|
| 9,928,927 B2 | 3/2018 | McGuire |
| 9,959,942 B2 | 5/2018 | McGuire |
| 2005/0128137 A1 | 6/2005 | Lee et al. |
| 2016/0118715 A1 | 4/2016 | Adams et al. |
| 2018/0068748 A1 | 3/2018 | McGuire |

OTHER PUBLICATIONS

Draper et al. "The Global Precipitation Measurement (GPM) Microwave Imager (GMI): Instrument Overview and Early On-Orbit Performance," IEEE Journal of Selected Topics in Applied Earth Observations and Remote Sensing, Jul. 2015, vol. 8, No. 7, pp. 3452-3462.

* cited by examiner

RADIO FREQUENCY PHASE CORRECTION SYSTEMS AND METHODS

CROSS-REFERENCE TO RELATED APPLICATIONS

This application claims the benefit of U.S. Provisional Patent Application Ser. No. 62/665,209, filed May 1, 2018, the entire disclosure of which is hereby incorporated herein by reference.

FIELD

This disclosure is directed towards systems and methods that allow radio frequency signal line path length differences to be determined in a deployed system.

BACKGROUND

Contemporary radio frequency (RF) communication systems and instruments require precise alignment and phase-stability to operate as designed. For example, monopulse antenna tracking systems use the RF phase of a mono pulse signal to correct the pointing of an RF antenna. As another example, systems used for ocean surface vector wind measurements rely on RF data from both horizontal and vertical polarizations in order to derive Stokes parameters. The sensitivity of such systems to changes in phase is particularly evident at high frequencies. For example, for a system operating in the Ka-band (30 GHz), a 1.1 mil (0.028 mm) change in the length of the signal path results in a 1° shift in phase. However, flex waveguides used in practical antenna systems to decouple structural loads and to absorb the mechanical tolerance buildup routinely experience mobility resulting in variations in electrical length of greater than acceptable amounts (e.g. greater than 2.4 mil (0.06 mm)).

Contemporary methods for pointing monopulse antenna tracking systems include receiving a signal at two antennas of an antenna system and measuring differences between the signal as received at the two antennas. The differences that are measured can include a difference in signal strength and/or phase. Such techniques require well characterized signal paths for received signals. However, a problem often encountered in a frontend RF system is a high phase error due to unpredictable RF phase changes or a high amplitude error due to path loss changes. Such changes can be caused by various environmental and operating conditions, which cannot be easily mitigated by design or simulated in a mathematical model. These conditions can include changes due to temperature shifts, vibrations, or mechanical displacement. The resulting errors can degrade the coherency of the signals. This degradation can in turn lead to the measured signal becoming unreliable and difficult to interpret. Degradation in coherency can also lead to an issue where control systems cannot function properly due to erroneous inputted data.

These problems can be at least partially addressed by engineering systems with high mechanical and thermal stability; however, such systems often result in structures that are relatively heavy, making them impractical for use in space or other applications in which relatively low weight is a requirement. In addition, even the most carefully engineered and produced system may not be capable of maintaining path length differences within the tightest tolerances over long periods of time or in the presence of environmental extremes. Alternatively, or additionally, the performance of a system over a wide range of operating conditions can be characterized, and adjustment factors can be applied to tune the system based on information regarding the environmental conditions while the antenna is in operation. This correction method involves only compensating for the phase error in data analysis instead of physically or electrically changing the phase of the RF pathway. However, such systems are limited in that they are incapable of sensing changes in signal path length due to unanticipated or unmeasured environmental or mechanical conditions.

SUMMARY

Embodiments of the present disclosure provide antenna systems and methods capable of accurately characterizing the performance of signal paths within the system while it is in an operational position and immediately before and after the antenna system is in operation. Moreover, embodiments of the present disclosure can adjust the electrical length of signal lines or paths to correct for variations in path length due to environmental or operational changes.

Systems in accordance with embodiments of the present disclosure include one or more antenna elements that are each associated with a signal line. Each signal line is associated with a signal coupler that is connected to a signal generator, and that is operable to inject a signal from the signal generator at a point adjacent or near the antenna element. In accordance with at least some embodiments, a signal line can include a flexible connector, in which case the signal coupler is located between the antenna element and the flexible connector. In addition, each signal line is associated with a controllable or commandable phase shifter, which can be operated in response to a command from a controller to adjust an effective electrical length of the associated signal line.

Methods in accordance with embodiments of the present disclosure include injecting a signal into a signal line at a location near an antenna element. The signal is passed through the signal line, and is analyzed at a receiver to determine whether the signal line is within specification. In response to a determination that the signal line is outside of specification, for instance if it is determined that the electrical length of the signal line has changed more than an allowable amount, the effective electrical length of the signal line can be adjusted. For example, a commandable phase shifter associated with the signal line can be adjusted to alter the effective electrical length of the signal line until that length is within specification.

Embodiments of the present disclosure can include phase correction systems and methods that can be applied in a deployed or non-deployed, operating antenna system. Embodiments of the present disclosure provide the ability to actively monitor the RF performance of a front end RF system starting at the antenna horn or element. Any phase error introduced due to changes in environments for thermal, vibrational, mechanical, or dielectric constant of the propagating medium can be monitored. The phase error can then be corrected using a commandable phase shifter. In addition, the approaches described herein allow more flexibility in routing and placing interconnects and signal lines connecting antenna elements to associated radio frequency receivers.

Instead of electrically/physically changing the phase of the RF pathway, some embodiments of the present disclosure can include using phase information from signals to generate correction terms in data processing systems. Even absent correcting changing a phase of an RF pathway, correction terms can be used to account for phase errors in signal transmissions through the use of data processing.

Additional features and advantages of embodiments of the disclosed antenna systems and methods will become more readily apparent from the following description, particularly when taken together with the accompanying drawings.

DETAILED DESCRIPTION

Figure 1:
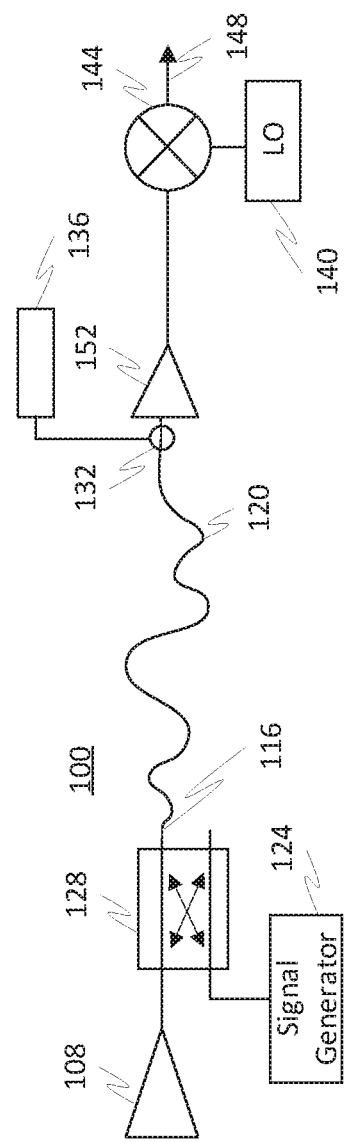
FIG. 1 is a block diagram depicting an antenna system incorporating a phase monitoring system in accordance with embodiments of the present disclosure.

With reference now to FIG. 1, an antenna system 100 incorporating a phase monitoring system 104 in accordance with embodiments of the present disclosure is depicted. The antenna system 100 generally includes an antenna horn or receiving element 108 that is connected to a receiver 112 by a radio frequency pathway, hereinafter referred to as signal line 116. The signal line 116 may include one or more flexible connectors 120, such as flexible waveguides, to provide required compliance and mobility in the signal line 116. The phase monitoring system 104 includes a test signal generator 124 and a signal coupler 128. In accordance with embodiments of the present disclosure, the signal coupler 128 is connected to the signal line 116 immediately adjacent to the antenna horn 108. Moreover, the flexible connector 120 is between the point at which the signal coupler 128 is joined to the signal line 116 and the receiver 112.

The phase monitoring system 104 can optionally include or be associated with a commandable or selectively controllable phase shifter 132 to adapt the antenna system 100 in response to detected changes in the electrical length of the signal line 116 as determined by monitoring a test signal injected by the test signal generator 124 at the receiver 112. If provided, the effective electrical path length of the signal line 116 can be varied by the selectively controllable phase shifter 132 in response to commands from a controller or processor 136. Alternatively, or additionally, the phase monitoring system 104 can include or be associated with a controller 136 that compensates for detected phase errors through data analysis and post processing instead of physically or electrically changing the phase of the signal lines 116.

The signal generator 124 is configured to produce a well-characterized test signal. In accordance with embodiments of the present disclosure, the test signal can be within or can include certain radio frequencies. Moreover, the test signal frequencies can include frequencies within an operating band of the antenna system 100. The test signal can be a monopulse signal, a noise signal, a multiple tone signal, or any other signal. In addition, the test signal can be controlled as to the included frequency or frequencies, pulse length, amplitude, modulation, or the like. The timing and content of the test signal produced by the test signal generator 124 can be controlled by the controller 136. The test signal from the signal generator 124 is injected into the signal line 116 by the signal coupler 128. The signal coupler 128 can comprise a radio frequency coupler.

The receiver 112 can incorporate a local oscillator 140 and a mixer 144 combining the signal received over the signal line 116 with a signal from the local oscillator 140, thereby producing an intermediate frequency signal 148 that can be passed to downstream electronics. The receiver 112 can additionally include an amplifier 152. Moreover, controllable phase shifters 132, if provided, can be incorporated into the receiver 112 or can be provided separately.

Figure 2:
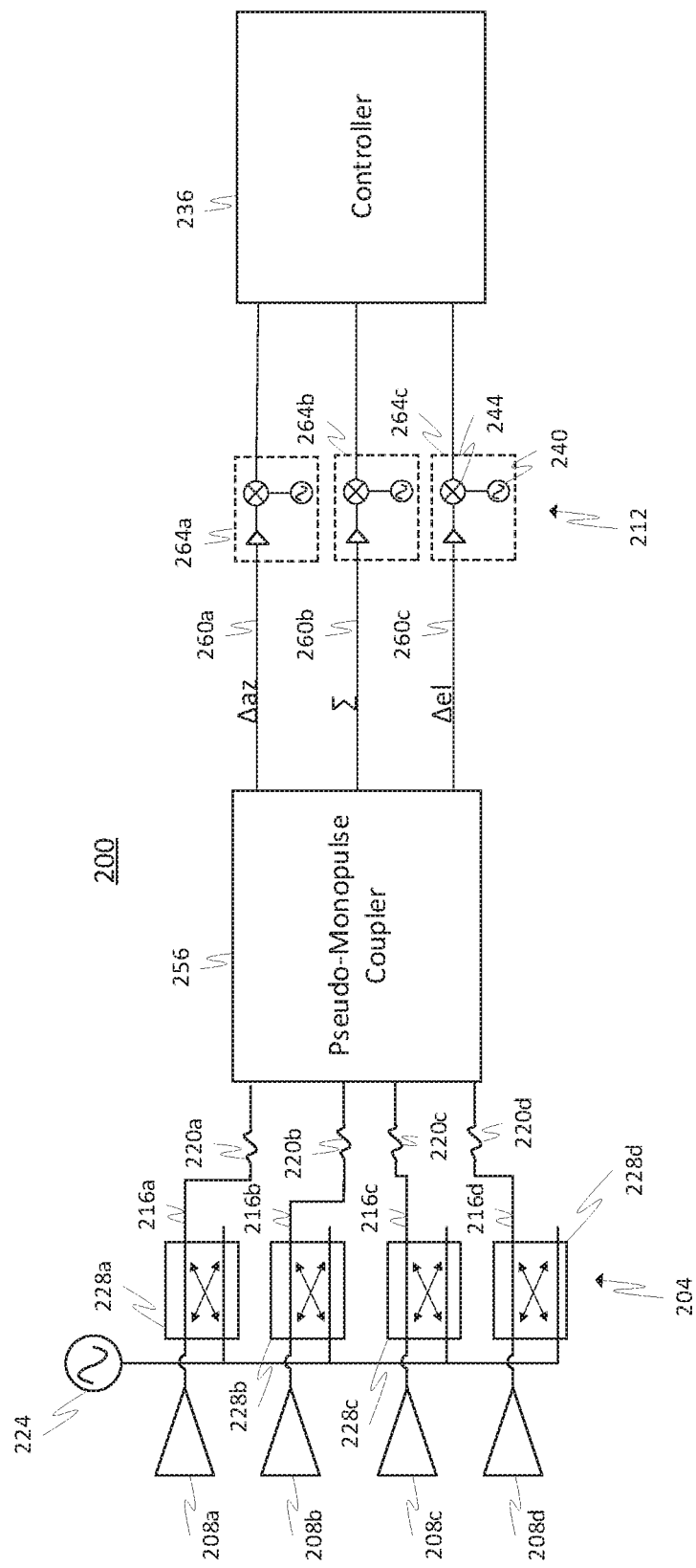
FIG. 2 is a block diagram depicting an antenna system incorporating a phase monitoring system in accordance with other embodiments of the present disclosure.

With reference now to FIG. 2, an antenna system 200 incorporating a phase monitoring system 204 in accordance with one or more embodiments of the present disclosure is depicted. The antenna system 200 generally includes a plurality of antenna horns or elements 208 connected to a receiver 212 by radio frequency pathways or signal lines 216. The signal lines 216 may include one or more flexible connectors 220, such as flexible waveguides, to provide compliance and mobility in the signal lines 216. The phase monitoring system 204 may include a signal generator 224 connected to a plurality of signal couplers 228, with each signal line 216 in the plurality of signal lines being associated with one of the signal couplers 228. More particularly, a signal coupler 228 may be connected to a respective signal line 216 at an end of the signal line immediately adjacent to an antenna horn 208. In addition, the flexible connector 220 of the signal line 116 is between the signal coupler 228 and the receiver 212. As can be appreciated by one of skill in the art after consideration of the present disclosure, each of the signals carried by the signal lines 216 can have a specific relationship to the signal carried at least one of the other signal lines 216. For example, a first pair of signal lines 216 can together provide an elevation difference signal, while a second pair of signal lines 216 can together provide an azimuth difference signal. Differences in the propagation time or other characteristics of a test signal injected in a related pair of signal lines can be monitored to provide an indication of differences in the effective electrical path length of the signal lines 216.

In some embodiments, the receiver 212 includes a pseudo-monopulse coupler 256 that operates to produce three phase insensitive signals from received signals passed to the pseudo-monopulse coupler 256 by the four signal lines 216. The phase insensitive signals include an azimuth difference signal carried by a first phase insensitive signal line 260a, a sum signal carried by a second phase insensitive signal line 260b, and an elevation difference signal carried by a third phase insensitive signal line 260c. The sum and difference signals are passed to respective receive modules 264a-c. Each of the receive modules 264 may include a local oscillator 240 and a mixer 244. The mixer 244 may mix a signal carried by a respective phase insensitive signal line 260 and a signal from the local oscillator 240, thereby producing an intermediate signal 248a-c. The intermediate signals 248 are provided to a controller 236.

In the exemplary embodiment depicted in FIG. 2, the pseudo-monopulse coupler 256 includes individually commandable phase shifters 232a-d which allow the effective electrical length of an associated signal line 216a-d to be varied. More particularly, the phase shifters 232a-d can be individually controlled so that the effective electrical lengths of the signal lines 216a-d are equalized. Thus the antenna system 100 can adapt to and compensate for detected changes in the electrical length of the signal lines 216. Alternatively or additionally, the controller 236 of the phase monitoring system 204 can compensate for detected phase errors through data analysis and post processing as opposed to physically or electrically changing the phase of the signal lines 216.

Although four horns or elements 208a-d and a like number of associated signal lines 216a-d, flexible connectors 220a-d, signal couplers 228a-d, and phase shifters 232a-d are included in the illustrated example system 200, it should be appreciated that an antenna system 200 in accordance with embodiments of the present disclosure can include any number of antenna elements 208 and associated components 216, 220, 228 and 232.

As in other embodiments, the signal generator 224 is configured to produce a well-characterized test signal, which can include radio frequencies within an operating band of the antenna system 200. In accordance with embodiments of the present disclosure, the signal generator 224 can be connected to the signal couplers 228 by equal length connectors, to ensure that the signal produced by the signal generator 224 is received at the signal couplers 228 at the same time. The timing and content of the test signal produced by the test signal generator 224 can be controlled by the controller 236. The signal couplers 228 can comprise radio frequency couplers that are identical to one another. Moreover, the signal couplers 228 can be connected the respective signal lines 216 at the same electrical distance from the pseudo-monopulse coupler 256.

Figure 3:
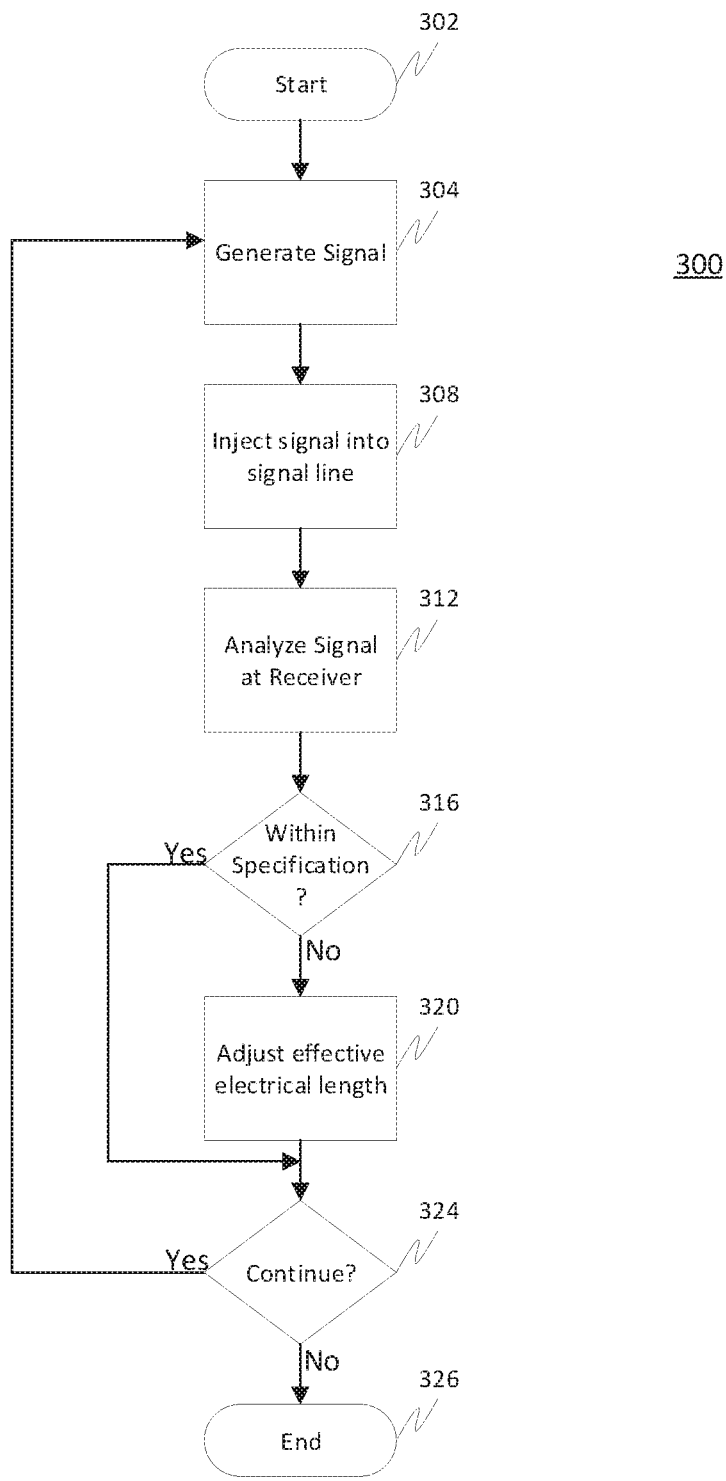
FIG. 3 is a flowchart depicting aspects of a method for phase monitoring in an antenna system in accordance with embodiments of the present disclosure.

Aspects of a method 300 for determining and correcting the phase of an antenna system 100 or 200 in accordance with embodiments of the present disclosure is depicted in FIG. 3. The method can be implemented by, for example, the execution of programming code or instructions by a controller 136 or 236 included in the antenna system 100 or 200. The method 300 may begin at step 302 and initially, at step 304, a test signal is generated by a signal generator 124 or 224. The test signal can be a well characterized signal and can consist of a single frequency, a range of frequencies, a set of frequencies, or the like. In accordance with at least some embodiments, the signal includes one or more radio frequencies within an operational frequency range of the antenna system 100. The test signal can also be of a predetermined duration, pattern, and/or amplitude.

The generated test signal is then injected into a signal line 116 or 216 (step 308). The injection point can be immediately behind an antenna horn or element 108 or 208 at or near the point of connection between the antenna horn 108 or 208 and the signal line 116 or 216. Accordingly, the test signal may be passed through the majority (e.g. greater than 99%) of the length of the signal line 116 or 216. Where the antenna system 100 includes multiple signal lines 116 or 216, the test signal from a single signal generator 124 or 224 can be provided to each of the signal lines 116 or 216.

The generated test signal may then be analyzed at an end of the signal line 116 or 216 adjacent the receiver, at step 312. At step 316, a determination can be made as to whether the signal received at the receiver 112 or 212 is within specification. For example, if an effective electrical length of a signal line 116 or 216 has changed more than an allowable amount, the transit time, shaping, or other characteristic of the signal may be different at the receiver 112 or 212 as compared to at the injection point. Moreover, where the antenna system 200 features multiple antenna horns or elements 208 and multiple signal lines 216, different times of arrival at the receiver for a signal injected into each of the signal lines 216 at the same time can provide an indication of changes to the effective electrical length of the signal lines 216.

If the effective electrical length of the signal line 116 or lines 216 is not within specification, the process may proceed to step 320, and the effective electrical length of any signal line 116 or 216 found to be outside of the specification can be adjusted. For example, a phase shifter 132 or 232 associated with the affected signal line 116 or 216 can be adjusted to alter the effective electrical length of the signal line 116 or 216 until it is within specification.

After adjusting the effective electrical length of the signal line 116 or lines 216, or after determining that the signal line 116 or lines 216 are within specification, a determination can be made as to whether the process is to continue at step 324. If the determination is yes, then the process may return to step 304. If the determination is no, then the method 300 may end at step 326. In an exemplary embodiment, the steps of generating and injecting signals can be performed periodically. The frequency of the test and any required adjustments can depend on various factors, such as an expected or measured rate of change in the ambient temperature or other environmental conditions, the sensitivity of the system, the rate of usage of the antenna system 100 or 200, or the like. In accordance with still other embodiments of the present disclosure, a test signal can be generated and injected prior to use of the antenna system 100 or 200. If a determination is made that the process should be discontinued, the process may end at step 326.

A phase monitoring system 104 or 204 in accordance with embodiments of the present disclosure may allow the effective electrical length of a signal line 116 or 216 to be determined while the associated antenna system 100 is in a deployed state. For example, a phase monitoring system 104 or 204 can operate as part of an antenna system 100 or 200 carried by a satellite, or other platform, while the platform is in orbit or otherwise in an operational position. In addition, a phase monitoring system 104 or 204 can be associated with any type of antenna system 100 or 200 or antenna element 108 or 208, to monitor an electrical length of an associated signal line 116 or 216 or signal phase. Moreover, a phase shifter 132 or 232 can be controlled in response to correct phase errors or differences associated with a signal line 116 or 216.

Figure 4:
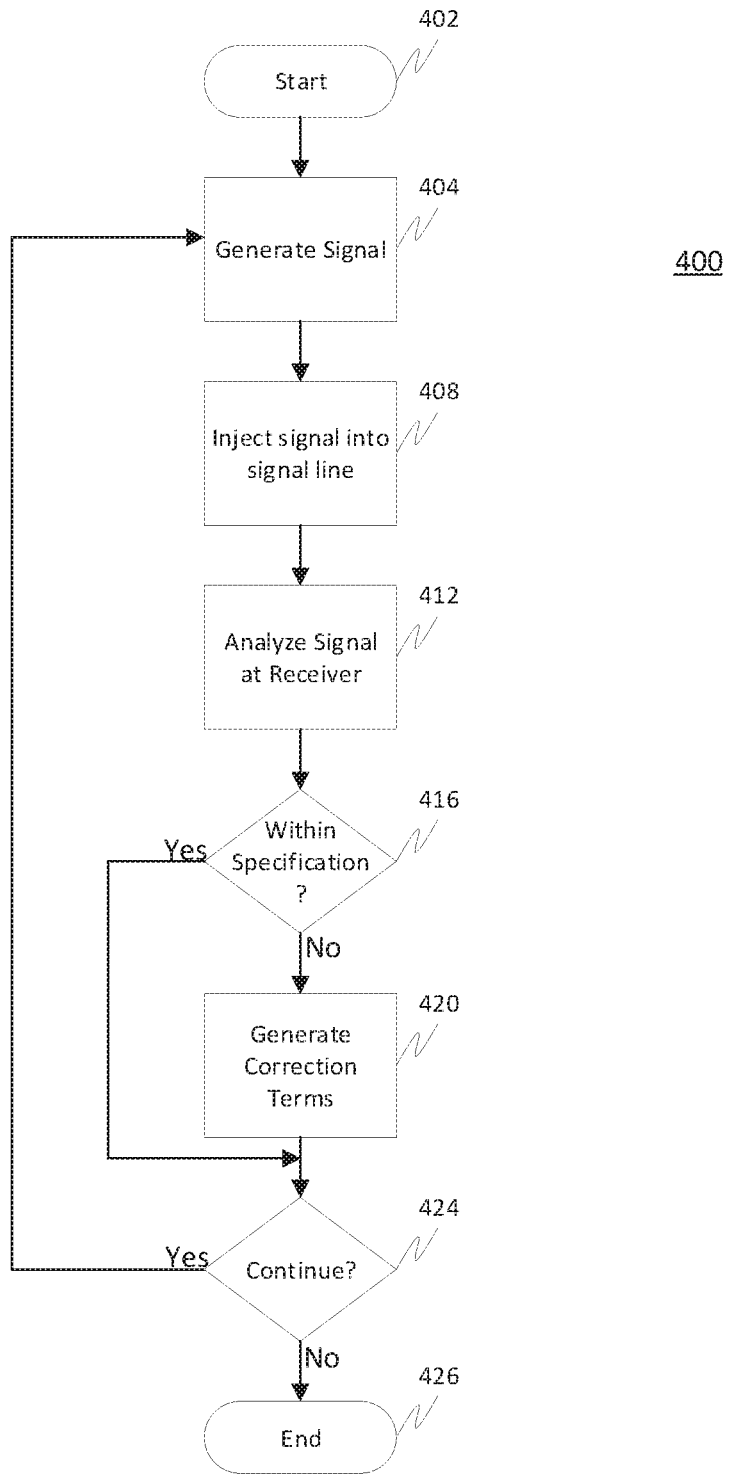
FIG. 4 is a flowchart depicting aspects of a method for generating phase information correction terms in accordance with embodiments of the present disclosure.

As illustrated in FIG. 4, in some embodiments phase information obtained from signals may be used to generate correction terms. Instead of electrically/physically changing the phase of an RF pathway, data processing techniques may be used with the generated correction terms to account for and remedy any phase issues with incoming signals. The method 400 illustrated in FIG. 4 may begin at step 402 in which a signal is transmitted over a transmission line. At step 404, a test signal may be generated by a signal generator 124 or 224. The test signal can be a well characterized signal and can consist of a single frequency, a range of frequencies, a set of frequencies, or the like. In accordance with at least some embodiments, the signal includes one or more radio frequencies within an operational frequency range of the antenna system 100. The test signal can also be of a predetermined duration, pattern, and/or amplitude.

The generated test signal may then be injected into a signal line 116 or 216 (step 308). The injection point can be immediately behind an antenna horn or element 108 or 208 at or near the point of connection between the antenna horn 108 or 208 and the signal line 116 or 216. Accordingly, the test signal may be passed through the majority (e.g. greater than 99%) of the length of the signal line 116 or 216. Where the antenna system 100 includes multiple signal lines 116 or 216, the test signal from a single signal generator 124 or 224 can be provided to each of the signal lines 116 or 216.

The generated test signal may then be analyzed at an end of the signal line 116 or 216 adjacent the receiver, at step 412. At step 416, a determination can be made as to whether the signal received at the receiver 112 or 212 is within specification. For example, if an effective electrical length of a signal line 116 or 216 has changed more than an allowable amount, the transit time, shaping, or other characteristic of the signal may be different at the receiver 112 or 212 as compared to at the injection point. Moreover, where the antenna system 200 features multiple antenna horns or elements 208 and multiple signal lines 216, different times of arrival at the receiver for a signal injected into each of the signal lines 216 at the same time can provide an indication of changes to the effective electrical length of the signal lines 216.

If the effective electrical length of the signal line 116 or lines 216 is not within specification, the process may proceed to step 420, and correction terms may be generated for any signal line 116 or 216 found to be outside of the specification. For example, correction terms which may be implemented using a phase shifter 132 or 232 associated with the affected signal line 116 or 216 may be generated such that the phase shifter 132 or 232 can be adjusted to alter the effective electrical length of the signal line 116 or 216 until it is within specification. In accordance with further embodiments, the correction terms generated in step 420 may be used during signal processing to effect phase correction of the signal using data processing methods. In this way, physically manipulating the transmission line such as by controlling the phase shifters to change the effective length of the line may be avoided if necessary or desirable.

After correction terms are generated for any of the signal line 116 or lines 216 found to be outside of the specification, or after determining that the signal line 116 or lines 216 are within specification, a determination can be made as to whether the process is to continue at step 424. If the determination is yes, then the process may return to step 404. If the determination is no, then the method 400 may end at step 426. In an exemplary embodiment, the steps of generating correction terms can be performed periodically. The frequency of the test and correction term generation can depend on various factors, such as an expected or measured rate of change in the ambient temperature or other environmental conditions, the sensitivity of the system, the rate of usage of the antenna system 100 or 200, or the like. In accordance with still other embodiments of the present disclosure, a test signal can be generated and injected prior to use of the antenna system 100 or 200. If a determination is made that the process should be discontinued, the process may end at step 426.

Using a method 400 as described above in relation to FIG. 4, phase correction may be performed either physically or digitally via data processing methods. As a result, data analysts may proceed with either approach depending on each situation and whether a transmission system may be adjusted physically using one or more phase shifters or whether data processing methods are preferable.

The foregoing description of antenna systems has been presented for purposes of illustration and description. Further, the description is not intended to limit the disclosed antenna systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A phase correction system, comprising:
a first antenna element;
a receiver;
a first signal line connecting the first antenna element to the receiver, wherein the first signal line includes a first flexible component;
a signal generator; and
a first signal coupler, wherein the first signal coupler joins the signal generator to the first signal line at a point that is between the first antenna element and the first flexible component of the first signal line.

2. The system of claim 1, further comprising:
second, third, and fourth antenna elements;
second, third, and fourth signal lines connecting the second, third, and fourth antenna elements respectively to the receiver;
second, third, and fourth signal couplers joining the signal generator to the second, third, and fourth signal lines respectively at points adjacent a respective antenna element.

3. The system of claim 2, wherein phase insensitive signals are generated from a signal injected into the first signal line, wherein a change in the effective electrical length is determined by detecting a difference in a phase of the signal in the first signal line as compared to a phase of an injected signal in the second signal line.

4. The system of claim 1, wherein an effective electrical length of the first signal line is modified.

5. The system of claim 4, wherein a signal is injected into the first signal line.

6. A phase correction system, comprising:
first, second, third, and fourth antenna elements;
a receiver;
first, second, third, and fourth signal lines connecting the first, second, third, and fourth antenna elements respectively to the receiver;
a signal generator;
first, second, third, and fourth signal couplers joining the signal generator to the first, second, third, and fourth signal lines respectively at points adjacent a respective antenna element, wherein the first signal coupler joins the signal generator to the first signal line; and
a pseudo-monopulse coupler that includes a plurality of commandable phase shifters.

7. The system of claim 6, wherein the first signal line includes a first flexible component, and wherein the signal generator is joined to the first signal line at a point that is between the first antenna element and the first flexible component.

8. A method for correcting the phase of an antenna system, comprising:
injecting a signal into a signal line at a point adjacent an antenna element, wherein the point of signal injection is between the antenna element and a first flexible component of the signal line;
receiving the injected signal at a receiver; and
detecting a change in an effective electrical length of the signal line from at least a first characteristic of the received signal.

9. The method of claim 8, further comprising:
modifying an effective electrical length of the signal line.

10. The method of claim 9, wherein modifying an effective electrical length of the signal line includes modifying a phase of a signal carried by the signal line.

11. The method of claim 8, wherein the signal injected into the signal line includes a selected frequency.

12. The method of claim 8, further comprising:
injecting a signal into each of a plurality of signal lines;
generating phase insensitive signals from the signal injected into the plurality of signal lines, wherein detecting a change in an effective electrical length includes detecting a difference in a phase of the injected signal in a first one of the signal lines as compared to a phase of the injected signal in a second one of the signal lines.

13. The method of claim 12, wherein the signal injected to each of the plurality of signal lines is generated by a single signal generator.

14. A system comprising:
a first antenna element;
a receiver;
a first signal line connecting the first antenna element to the receiver, wherein the first signal line includes a first flexible component;
a signal generator;
a first signal coupler, wherein the first signal coupler joins the signal generator to the first signal line at a point that is between the first antenna element and the first flexible component of the first signal line;
a first phase shifter, wherein the first phase shifter is operable to vary an effective electrical path length of the first signal line; and
a controller, wherein the controller is operable to control the first phase shifter to maintain the effective electrical path length of the first signal line at a specified value.

15. The system of claim 14, wherein the first signal coupler is a radio frequency coupler.

16. The system of claim 14, further comprising:
second, third, and fourth antenna elements;
second, third, and fourth signal lines connecting the second, third, and fourth antenna elements respectively to the receiver;
second, third, and fourth signal couplers joining the signal generator to the second, third, and fourth signal lines respectively at points adjacent a respective antenna element.

17. A system comprising:
first, second, third, and fourth antenna elements;
a receiver;
first, second, third, and fourth signal lines connecting the first, second, third, and fourth antenna elements respectively to the receiver;
a signal generator;
first, second, third, and fourth signal couplers joining the signal generator to the first, second, third, and fourth signal lines respectively at points adjacent a respective antenna element;
first, second, third, and fourth phase shifters, wherein the first, second, third, and fourth phase shifters are operable to vary an effective electrical path length of the first, second, third, and fourth signal lines respectively;
a controller, wherein the controller is operable to control the first, second, third and fourth phase shifters to maintain the effective electrical path length of the respective first, second, third and fourth signal lines at a specified value; and
a pseudo-monopulse coupler that includes the first phase shifter associated with the first signal line, the second phase shifter associated with the second signal line, the third phase shifter associated with the third signal line, and the fourth phase shifter associated with the fourth signal line.

18. The system of claim 17, wherein the first signal line includes a first flexible component, and wherein the signal generator is joined to the first signal line at a point that is between the first antenna element and the first flexible component.

19. The system of claim 17, wherein an output of the pseudo-monopulse coupler includes an azimuth difference signal, a sum signal, and an elevation difference signal.

* * * * *